US012785555B2

(12) United States Patent
Tan et al.

(10) Patent No.: US 12,785,555 B2
(45) Date of Patent: Nov. 3, 2026

(54) REGULATOR OFFSET VOLTAGE CANCELATION

(71) Applicant: Rambus Inc., San Jose, CA (US)

(72) Inventors: Zheyuan Tan, San Jose, CA (US); Chenxiao Ren, Fremont, CA (US)

(73) Assignee: Rambus Inc., San Jose, CA (US)

( * ) Notice: Subject to any disclaimer, the term of this patent is extended or adjusted under 35 U.S.C. 154(b) by 111 days.

(21) Appl. No.: 19/017,222

(22) Filed: Jan. 10, 2025

(65) Prior Publication Data

US 2025/0323574 A1 Oct. 16, 2025

Related U.S. Application Data

(60) Provisional application No. 63/634,096, filed on Apr. 15, 2024.

(51) Int. Cl.
*H02M 3/145* (2006.01)

(52) U.S. Cl.
CPC .................................. *H02M 3/145* (2013.01)

(58) Field of Classification Search
None
See application file for complete search history.

(56) References Cited

U.S. PATENT DOCUMENTS

| | | | | |
|---|---|---|---|---|
| 8,791,678 | B2 | 7/2014 | Tai et al. | |
| 8,981,743 | B2 | 3/2015 | Zambetti et al. | |
| 9,455,630 | B2 | 9/2016 | Maede et al. | |
| 9,647,552 | B2 | 5/2017 | Li | |
| 10,250,138 | B2 | 4/2019 | Isham | |
| 10,418,896 | B2 | 9/2019 | Takada | |
| 2006/0273772 | A1* | 12/2006 | Groom .................. | H02M 3/157 323/284 |
| 2010/0327835 | A1* | 12/2010 | Archibald ............. | H05B 45/46 323/282 |

* cited by examiner

*Primary Examiner* — Crystal L Hammond
(74) *Attorney, Agent, or Firm* — The Neudeck Law Firm, LLC

(57) ABSTRACT

A target voltage is compared to a feedback voltage from a switching voltage regulator circuit (e.g., constant on-time regulator). The output of this comparison is integrated by an analog integrator. The analog output of the integrator is input to a three-level comparator that determines whether a saturating digital counter will increase (e.g., increment), decrease (e.g., decrement), or hold a current value. The output of the counter is summed with a digital value that was used to generate the target voltage to generate an offset canceled digital value. The offset canceled digital value is converted to an analog offset canceled reference voltage by a digital-to-analog converter. The analog offset canceled reference voltage is provided to the switching voltage regulator as the target voltage for the feedback loop of the regulator.

20 Claims, 5 Drawing Sheets

REGULATOR OFFSET VOLTAGE CANCELATION

DETAILED DESCRIPTION OF THE EMBODIMENTS

In an embodiment, a target voltage is compared to a feedback voltage from a switching voltage regulator circuit (e.g., constant on-time regulator). The output of this comparison is integrated by an analog integrator. The analog output of the integrator is input to a three-level comparator that determines whether a saturating digital counter will increase (e.g., increment), decrease (e.g., decrement), or hold a current value. In an example, if the output of the integrator is greater than a first threshold (e.g., $0.67_{VDD}$), the counter is to increase. If the output of the integrator is less than a second threshold (e.g., $0.33_{VDD}$), the counter is decreased. If the output of the integrator is between the first threshold and the second threshold (e.g., greater than $0.33_{VDD}$ and less than $0.67_{VDD}$), the counter holds its current value and is not increased or decreased.

In an embodiment, the output of the counter is summed with a digital value that was used to generate the target voltage to generate an offset canceled digital value. The offset canceled digital value is converted to an analog offset canceled reference voltage by a digital-to-analog converter. The analog offset canceled reference voltage is provided to the switching voltage regulator as the reference voltage for the feedback loop of the regulator. In an embodiment, the offset canceled digital value may be determined once after power up and then remain at the same value during normal operation. In an embodiment, the offset canceled digital value may be periodically and/or continuously determined during normal operation.

Figure 1:
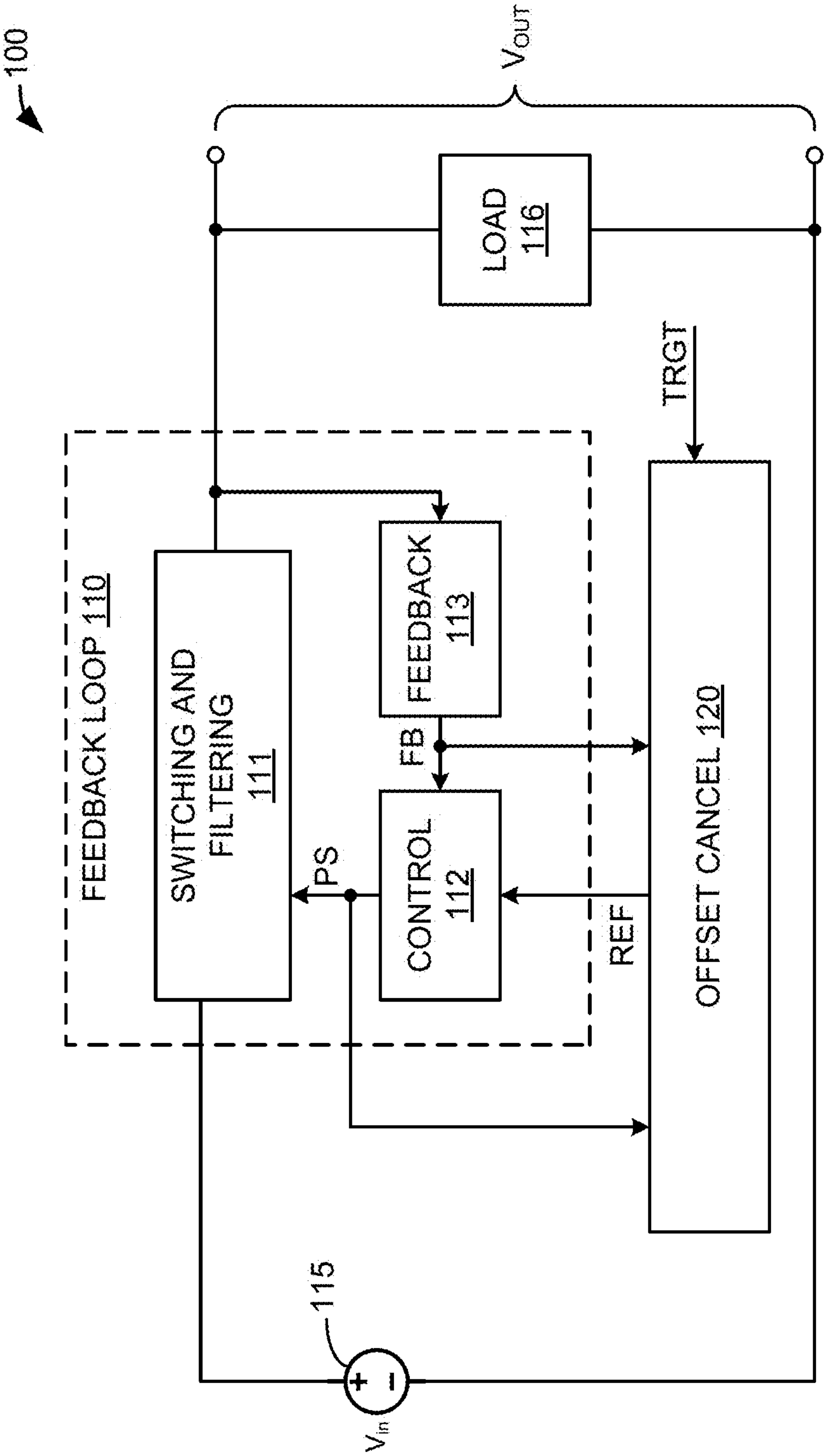
FIG. 1 is a block diagram illustrating a voltage regulator.

FIG. 1 is a block diagram illustrating a voltage regulator. In FIG. 1, voltage regulator 100 comprises feedback loop 110, input voltage source 115, load 116, and offset cancellation circuitry 120. Feedback loop 110 includes switching and filtering circuitry 111, control circuitry 112, and feedback circuitry 113. Input voltage source 115 is provided to switching and filtering circuitry 111. Load 116 is operatively coupled to a current return path coupled to input voltage source 115.

It should be understood that load 116 being coupled back to input voltage source 115 as illustrated in FIG. 1 is merely one example. In some embodiments, one terminal (e.g., ground or negative) of input voltage source 115 may be isolated from load 116. Thus, in some embodiments, there may not be a no direct return current path from the terminal of load 116 that is not coupled to feedback loop 110 to input voltage source 115. In these embodiments, the terminal of input voltage supply 115 not coupled to feedback loop 110 may be coupled to a first local (to supply 115) ground and the terminal of load 116 not coupled to feedback loop 110 may be coupled to a second local (to load 116) ground that is isolated from the first local ground.

We could say the supply and load are each connected to their local ground.

Feedback circuitry 113 is operatively coupled to control circuitry 112 and offset cancellation circuitry 120. Feedback circuitry 113 produces a loop feedback indicator (FB) of the voltage ($V_{out}$) being provided by voltage regulator 100 to load 116. In an embodiment, feedback circuitry 113 may comprise a voltage divider circuit that produces a voltage that produces a scaled (divided) version of the output of voltage regulator 100 ($V_{out}$). Loop feedback indicator FB is provided to control circuitry 112 and offset cancellation circuitry 120.

Control circuitry 112 is operatively coupled to switching and filtering circuitry 111, feedback circuitry 113, and offset cancellation circuitry 120. Control circuitry 112 produces a pulsed signal (PS) that controls switching and filtering circuitry 111. Pulsed signal PS may be, or comprised, for example, a pulse width modulated (PWM) signal. Pulsed signal PS is also provided to offset cancellation circuitry 120. Control circuitry 112 also receives a reference voltage REF from offset cancellation circuitry 120.

In an embodiment, control circuitry 112 comprises constant on-time pulse circuitry that generates a constant width pulse in response to a first relationship between FB and REF (e.g., FB less than REF) and does not generate a pulse in response to a second relationship between FB and REF (e.g., FB greater or equal to REF). In an embodiment, pulsed signal PS controls switching and filtering circuitry 111 to increase (e.g., in response to a pulse) or decrease (in response to the lack of a pulse) $V_{out}$. Thus, it should be understood that the average frequency of pulses on PS may be based on the loop feedback indicator FB. In other embodiments (e.g., hysteresis control), control circuitry 112 may generate pulses that do not have a constant on-time (e.g., PWM of PS). In some embodiments, control circuitry 112 may comprise circuitry that generates pulses at a constant frequency and adjusts the duration (width) of pulses based on the relationship between FB and REF. In some embodiments, control circuitry 112 may comprise circuitry that adjusts both the frequency of, and the duration (width) of, pulses based on the relationship between FB and REF. In some embodiments, control circuitry 112 may comprise circuitry that adjusts one or more of, the amplitude of, the frequency of, and/or the duration (width) of, pulses based on the relationship between FB and REF.

Offset cancellation circuitry 120 receives feedback indicator FB, pulsed signal PS, and a target voltage indicator TRGT. In an embodiment, target voltage indicator TRGT is a digital value. Based on TRGT and FB, offset cancellation circuitry 120 produces a reference voltage REF that is provided to control circuitry 112. Offset cancellation circuitry 120 produces REF by altering a voltage indicative of TRGT that, when used as a reference voltage for feedback loop 110, reduces a voltage offset on Vout (i.e., a difference between an ideal $V_{out}$ produced in response to the supplied TRGT value with offset cancellation circuitry 120 supplying REF to control circuitry 112 and a $V_{out}$ that would be produced without offset cancellation circuitry 120).

In an embodiment, offset cancellation circuitry 120 compares a voltage that is based on TRGT to FB (or a voltage based on FB). Offset cancellation circuitry 120 integrates the result of the comparison using an analog integrator. In an embodiment, the analog integrator is reset to an initial value based on a selected number of pulses on PS. The analog output of the integration is used by offset cancellation circuitry 120 to determine whether to increase, decrease, or hold an offset cancellation value. Offset cancellation circuitry 120 sums the offset cancellation value to produce an offset cancelled version of TRGT. Based on the offset cancelled version of TRGT, offset cancellation circuitry 120 generates reference voltage REF that is used by control circuitry 112 to generate $V_{out}$. In an embodiment, the offset cancellation value may be determined once after power up of voltage regulator 100 and then remains at same value during normal operation. In an embodiment, the offset cancellation value may be periodically and/or continuously determined during normal operation.

Figure 2:
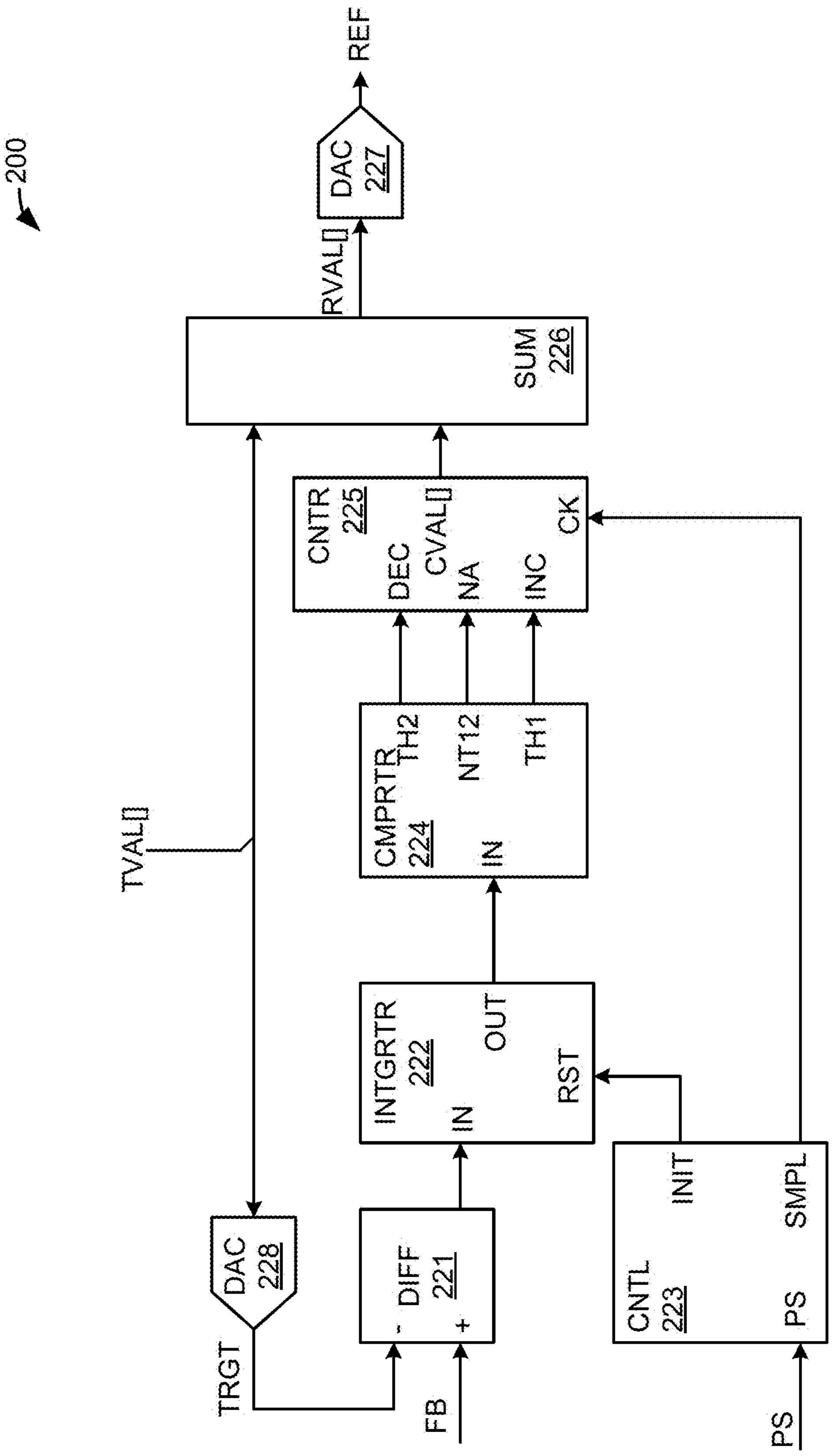
FIG. 2 is a block diagram illustrating offset voltage cancelation circuitry.

FIG. 2 is a block diagram illustrating offset voltage cancelation circuitry. In FIG. 2, offset voltage cancellation circuitry 200 comprises difference circuitry (a.k.a., error amplifier) 221, integrator circuitry 222, control circuitry 223, three-level comparator circuitry 224, digital counter circuitry 225, digital summer circuitry 226, digital-to-analog converter (DAC) 227, and DAC 228. In an embodiment, offset voltage cancellation circuitry 200 may be used as offset cancellation circuitry 120. In an embodiment, difference circuitry 221 may be an analog differential amplifier. In an embodiment, integrator circuitry 222 may be an analog capacitor based integrator.

Difference circuitry 221 receives a target voltage TRGT from DAC 228 and a feedback voltage FB. Target voltage TRGT from DAC 228 is produced by DAC based on the digital target value TVAL[ ]. In an embodiment, feedback voltage FB is, or is equivalent to, loop feedback indicator FB and/or target voltage TRGT is, or is equivalent to, target voltage indicator TRGT, as illustrated in FIG. 1. Difference circuitry 221 produces an indicator of the difference between TRGT and FB (e.g., FB−TRGT) and provides this indicator to the input of integrator circuitry 222 to be integrated.

In FIG. 2, the digital value TVAL[ ] to DAC 228 and SUM 226 is illustrated as being the same value and number of bits. However, in some embodiments, different digital values and/or different numbers of bits may be provided to DAC 228 and SUM 226. For example, the digital value provided to goes to SUM 226 could be a pre-set value (e.g., set during manufacture to be the same for all devices). In another example, the value provided to DAC 228 may be generated by automatic test equipment and/or during a testing process such that the value provided to DAC 228 varies from part to part. The value provided to DAC 228 for each part may be selected to cancel out input offset exhibited by DIFF 221. In some embodiments, the value provided to DAC 228 may have a higher resolution (i.e., more bits) than the value provided to SUM 226. The value provided to DAC 228 may have a higher resolution (i.e., more bits) than the value provided to SUM 226 in order to reduce or eliminate the effects of input offset exhibited by DIFF 221.

Integrator circuitry 222 integrates the indicator of the difference between TRGT and FB over a period of time determined by control circuitry 223. In an embodiment, control circuitry 223 receives pulsed signal PS. In an embodiment, pulsed signal PS is, or is equivalent to, pulsed signal PS that controls switching and filtering circuitry 111 as illustrated in FIG. 1. In an embodiment, the period of time that integrator circuitry 222 integrates the indicator of the difference between TRGT and FB is determined based on a selected number of pulses on pulsed signal PS. Thus, for example, control circuitry 223 may control integrator circuitry 222 to periodically re-initialize (a.k.a., reset) its output to a selected voltage (e.g., one-half of the power supply voltage powering offset voltage cancellation circuitry—e.g., $V_{dd}$) every eight (8) occurrences of pulses on PS. In other words, for example, control circuitry 223 may count the pulses (or falling edges, or rising edges, etc.) on PS starting at zero, and upon the occurrence (or end) of an eighth pulse, control integrator circuitry 222 to reset its output and reset its count of the pulses on PS back to zero.

The output of integrator circuitry 222 is provided to three-level comparator circuitry 224. Three-level comparator circuitry 224 outputs an indicator (or indicators) of one of three conditions. A first indicator (e.g., TH1) that may be output by comparator circuitry 224 indicates that the output of integrator circuitry 222 meets a first threshold condition (e.g., is less than a first threshold voltage—e.g., $V_{dd}/3$). A second indicator (e.g., TH2) that may be output by comparator circuitry 224 indicates that the output of integrator circuitry 222 meets a second threshold condition (e.g., is greater than a second threshold voltage—e.g., $2V_{dd}/3$). A third indicator (e.g., indicating not TH1 and not TH2—NT12) that may be output by comparator circuitry 224 indicates that the output of integrator circuitry 222 meets a third threshold condition (e.g., does not meet the first threshold condition and does not meet the second threshold condition. In other words, for example, is between the first threshold voltage and the second threshold voltage—e.g., $V_{dd}/3<IN<2V_{dd}/3$). The output(s) of comparator circuitry 224 is provided to counter circuitry 225.

Counter circuitry 225 is controlled by control circuitry 223. Counter circuitry 225 may be controlled by control circuitry 223 to, upon a signal from control circuitry 223 and based on the indicators received from comparator circuitry 224, increment, decrement, or remain the same (a.k.a., hold). In an embodiment, control circuitry 223 controls counter circuitry 225 to sample the indicator(s) received from comparator circuitry 224 based on a selected number of pulses on pulsed signal PS. Thus, for example, control circuitry 223 may control counter circuitry 225 to sample the indicator(s) received from comparator circuitry 224 on the seventh ($7^{th}$) pulse of every eight (8) occurrences of pulses on PS. In other words, control circuitry 223 may control counter circuitry 225 to sample the indicator(s) received from comparator circuitry 224 on the pulse immediately preceding the pulse on PS that causes a re-initialization (a.k.a., reset) of the output of integrator circuitry 222 to the selected voltage.

In an embodiment, if counter circuitry 225 is receiving, from comparator circuitry 224, an indicator that the first threshold condition is met when control circuitry 223 signals a sampling is to occur, counter circuitry increments its digital output value CVAL[ ]. If counter circuitry 225 is receiving, from comparator circuitry 224, an indicator that the second threshold condition is met when control circuitry 223 signals a sampling is to occur, counter circuitry decrements its digital output value CVAL[ ]. If counter circuitry 225 is receiving, from comparator circuitry 224, an indicator that the third threshold condition is met when control circuitry 223 signals a sampling is to occur, counter circuitry hold the current digital output value of CVAL[ ]. In an embodiment, counter circuitry 225 performs a saturating counter function. In other words, when CVAL[ ] reaches a selected limit (e.g., 0 or 7), CVAL[ ] does not "roll-over" on the next sampling of a decrement or increment signal, respectively (e.g., from 000b to 111b, or 111b to 000b).

The digital output value CVAL[ ] of counter circuitry 225 is summed with the digital target value TVAL[ ] to produce an offset canceled digital value RVAL[ ]. RVAL[ ] is provided to DAC 227. DAC 227 generates, based on the value of RVAL[ ], an analog reference voltage signal REF. In an embodiment, voltage reference signal REF is, or is equivalent to, reference voltage REF that is used by control circuitry 112 to generate $V_{out}$, as illustrated in FIG. 1.

In an embodiment, the output of saturating counter circuitry 225 is limited to a relatively small portion of a total possible $V_{out}$ (or TVAL[ ]) range. For example, CVAL[ ] may be limited by the saturating function of counter circuitry 225 to (or substantially to) −1% to +1% (e.g., 3-bits) of the possible range of $V_{out}$ (and/or TVAL[ ]—which may be, e.g., 10-bits). In an embodiment, difference circuitry 221 may comprise chopper circuitry to mitigate, for example, an input offset error present in difference circuitry 221.

It should also be understood that the "hold" function of counter circuitry 225 may function to reduce the number of changes to CVAL[ ] and RVAL[ ] (and thus, REF) when offset voltage cancellation circuitry 200 is approaching a stable (offset canceled) state. It should also be understood that, since at least counter circuitry 225 samples based on pulses on PS, when there are no pulses on PS (e.g., during overvoltage or transient overshoot conditions of voltage regulator 100), the RVAL[ ] is not changed thereby helping to prevent counter circuitry 225 from saturating under a "no-pulses" condition.

Figure 3:
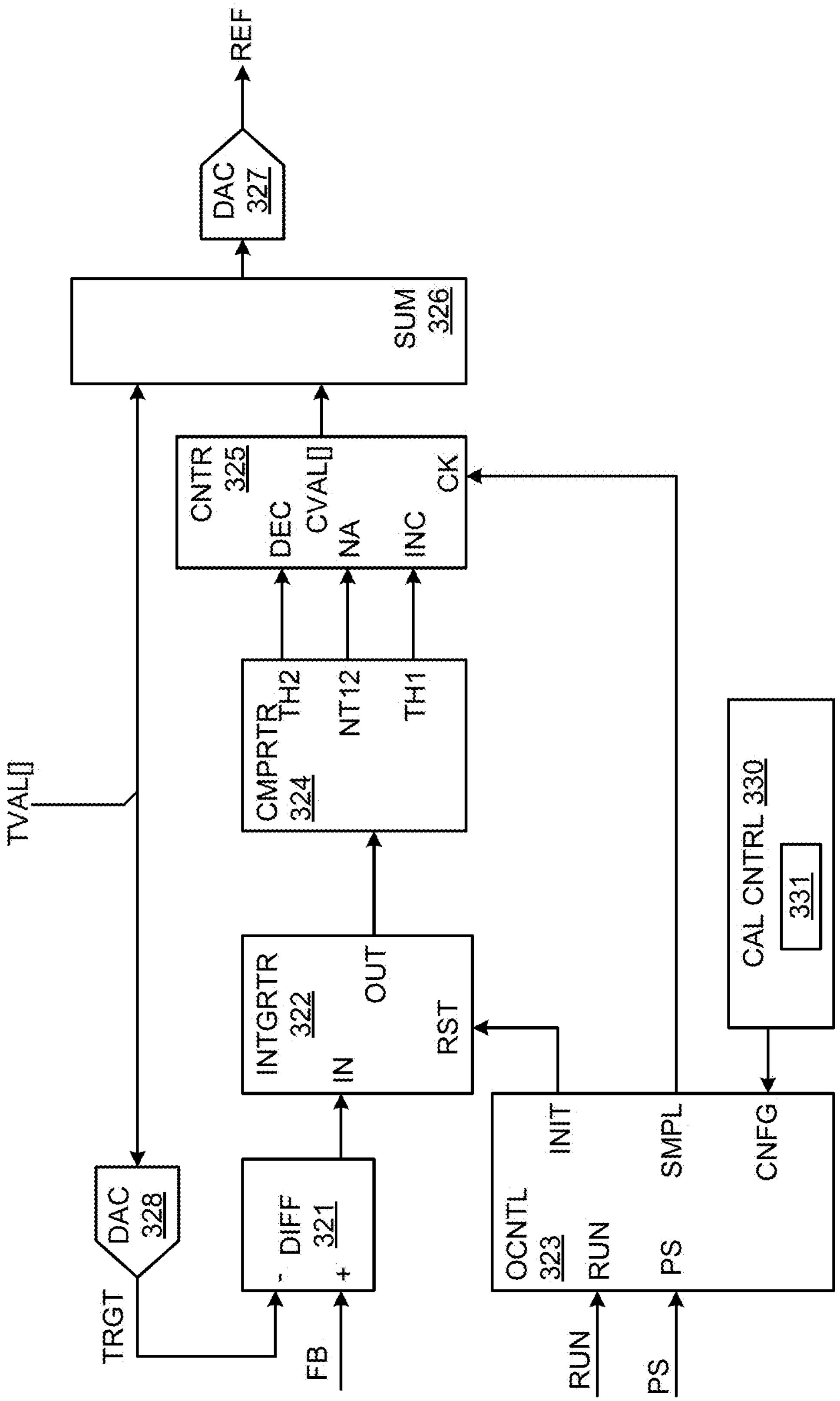
FIG. 3 is a block diagram illustrating controllable offset voltage cancelation circuitry.

FIG. 3 is a block diagram illustrating controllable offset voltage cancelation circuitry. In FIG. 3, offset voltage cancellation circuitry 300 comprises difference circuitry (a.k.a., error amplifier) 321, integrator circuitry 322, control circuitry 323, three-level comparator circuitry 324, digital counter circuitry 325, digital summer circuitry 326, digital-to-analog converter (DAC) 327, DAC 328, calibration control circuitry 330. Calibration control circuitry 330 includes mode circuitry (e.g., registers) 331. In an embodiment, offset voltage cancellation circuitry 300 may be used as offset cancellation circuitry 120. In an embodiment, difference circuitry 321 may be an analog differential amplifier. In an embodiment, integrator circuitry 322 may be an analog capacitor based integrator.

Difference circuitry 321 receives a target voltage TRGT from DAC 328 and a feedback voltage FB. Target voltage TRGT from DAC 328 is produced by DAC based on the digital target value TVAL[ ]. In an embodiment, feedback voltage FB is, or is equivalent to, loop feedback indicator FB and/or target voltage TRGT is, or is equivalent to, target voltage indicator TRGT, as illustrated in FIG. 1. Difference circuitry 321 produces an indicator of the difference between TRGT and FB (e.g., FB−TRGT) and provides this indicator to the input of integrator circuitry 322 to be integrated.

In FIG. 3, the digital value TVAL[ ] to DAC 328 and SUM 326 is illustrated as being the same value and number of bits. However, in some embodiments, different digital values and/or different numbers of bits may be provided to DAC 328 and SUM 326. For example, the digital value provided to goes to SUM 326 could be a pre-set value (e.g., set during manufacture to be the same for all devices). In another example, the value provided to DAC 328 may be generated by automatic test equipment and/or during a testing process such that the value provided to DAC 328 varies from part to part. The value provided to DAC 328 for each part may be selected to cancel out input offset exhibited by DIFF 321. In some embodiments, the value provided to DAC 328 may have a higher resolution (i.e., more bits) than the value provided to SUM 326. The value provided to DAC 328 may have a higher resolution (i.e., more bits) than the value provided to SUM 326 in order to reduce or eliminate the effects of input offset exhibited by DIFF 321.

Integrator circuitry 322 integrates the indicator of the difference between TRGT and FB over a period of time determined by control circuitry 323. In an embodiment, control circuitry 323 receives pulsed signal PS. In an embodiment, pulsed signal PS is, or is equivalent to, pulsed signal PS that controls switching and filtering circuitry 111 as illustrated in FIG. 1. In an embodiment, the period of time that integrator circuitry 322 integrates the indicator of the difference between TRGT and FB is determined based on a selected (e.g., by calibration control circuitry 330 and/or mode circuitry 331, in particular) number of pulses on pulsed signal PS. Thus, for example, control circuitry 323 may control, based on a mode, integrator circuitry 322 to periodically re-initialize (a.k.a., reset) its output to a selected voltage (e.g., one-half of the power supply voltage powering offset voltage cancellation circuitry—e.g., $V_{dd}$) every N occurrences of pulses on PS, where N is a positive integer determined by mode circuitry 331. In other words, for example, control circuitry 323 may count the pulses (or falling edges, or rising edges, etc.) on PS starting at zero, and upon the occurrence (or end) of an $N^{th}$ pulse, control integrator circuitry 322 to reset its output and reset its count of the pulses on PS back to zero.

The output of integrator circuitry 322 is provided to three-level comparator circuitry 324. Three-level comparator circuitry 324 outputs an indicator (or indicators) of one of three conditions. A first indicator (e.g., TH1) that may be output by comparator circuitry 324 indicates that the output of integrator circuitry 322 meets a first threshold condition (e.g., is less than a first threshold voltage—e.g., $V_{dd}/3$). A second indicator (e.g., TH2) that may be output by comparator circuitry 324 indicates that the output of integrator circuitry 322 meets a second threshold condition (e.g., is greater than a second threshold voltage—e.g., $2V_{dd}/3$). A third indicator (e.g., indicating not TH1 and not TH2—NT12) that may be output by comparator circuitry 324 indicates that the output of integrator circuitry 322 meets a third threshold condition (e.g., does not meet the first threshold condition and does not meet the second threshold condition. In other words, for example, is between the first threshold voltage and the second threshold voltage—e.g., $V_{dd}/3<IN<2V_{dd}/3$). The output(s) of comparator circuitry 324 is provided to counter circuitry 325.

Counter circuitry 325 is controlled by control circuitry 323. Counter circuitry 325 may be controlled by control circuitry 323 to, upon a signal from control circuitry 323 and based on the indicators received from comparator circuitry 324, increment, decrement, or remain the same (a.k.a., hold). In an embodiment, control circuitry 323 controls counter circuitry 325 to sample the indicator(s) received from comparator circuitry 324 based on a selected (e.g., by calibration control circuitry 330 and/or mode circuitry 331, in particular) number of pulses on pulsed signal PS. Thus, for example, control circuitry 323 may control counter circuitry 325 to sample the indicator(s) received from comparator circuitry 324 on the N−1 (or N−2, N−3, etc.) pulse of every N occurrences of pulses on PS. In other words, control circuitry 323 may control counter circuitry 325 to sample the indicator(s) received from comparator circuitry 324 on a selected pulse preceding (or succeeding) the pulse on PS that causes a re-initialization (a.k.a., reset) of the output of integrator circuitry 322 to the selected voltage.

In an embodiment, if counter circuitry 325 is receiving, from comparator circuitry 324, an indicator that the first threshold condition is met when control circuitry 323 signals a sampling is to occur, counter circuitry increments its digital output value CVAL[ ]. If counter circuitry 325 is receiving, from comparator circuitry 324, an indicator that the second threshold condition is met when control circuitry 323 signals a sampling is to occur, counter circuitry decrements its digital output value CVAL[ ]. If counter circuitry 325 is receiving, from comparator circuitry 324, an indicator that the third threshold condition is met when control circuitry 323 signals a sampling is to occur, counter circuitry hold the current digital output value of CVAL[ ]. In an embodiment, counter circuitry 325 performs a saturating counter function. In other words, when CVAL[ ] reaches a selected limit (e.g., 0 or 7), CVAL[ ] does not "roll-over" on the next sampling of a decrement or increment signal, respectively (e.g., from 000b to 111b, or 111b to 000b).

The digital output value CVAL[ ] of counter circuitry 325 is summed with the digital target value TVAL[ ] to produce an offset canceled digital value RVAL[ ]. RVAL[ ] is provided to DAC 327. DAC 327 generates, based on the value of RVAL[ ], an analog reference voltage signal REF. In an embodiment, voltage reference signal REF is, or is equivalent to, reference voltage REF that is used by control circuitry 112 to generate $V_{out}$, as illustrated in FIG. 1.

In an embodiment, the output of saturating counter circuitry 325 is limited to a relatively small portion of a total possible $V_{out}$ (or TVAL[ ]) range. For example, CVAL[ ] may be limited by the saturating function of counter circuitry 325 to (or substantially to) −1% to +1% (e.g., 3-bits) of the possible range of $V_{out}$ (and/or TVAL[ ]—which may be, e.g., 10-bits). In an embodiment, difference circuitry 321 may comprise chopper circuitry to mitigate, for example, an input offset error present in difference circuitry 321.

It should also be understood that the "hold" function of counter circuitry 325 may function to reduce the number of changes to CVAL[ ] and RVAL[ ] (and thus, REF) when offset voltage cancellation circuitry 300 is approaching a stable (offset canceled) state. It should also be understood that, since at least counter circuitry 325 samples based on pulses on PS, when there are no pulses on PS (e.g., during overvoltage or transient overshoot conditions of voltage regulator 100), the RVAL[ ] is not changed thereby helping to prevent counter circuitry 325 from saturating under a "no-pulses" condition.

In an embodiment, control circuitry 323 receives an indicator (RUN) that determines whether, and/or when, offset voltage cancellation circuitry 300 is to update RVAL[ ] and REF. In an embodiment, offset voltage cancellation circuitry 300 is controlled to find a steady-state RVAL[ ] (e.g., until stable, for a fixed number of PS pulses, or an analog time constant based period of time) once after other start up sequences for the integrated circuit including offset voltage cancellation circuitry 300 have completed. In another embodiment, offset voltage cancellation circuitry 300 may be controlled to continuously search for RVAL[ ] during operation of the integrated circuit. In this embodiment, mode circuitry 331 may be configured to increase N thereby increasing the averaging window for an up/down/hold decision by counter circuitry 225.

Figure 4:
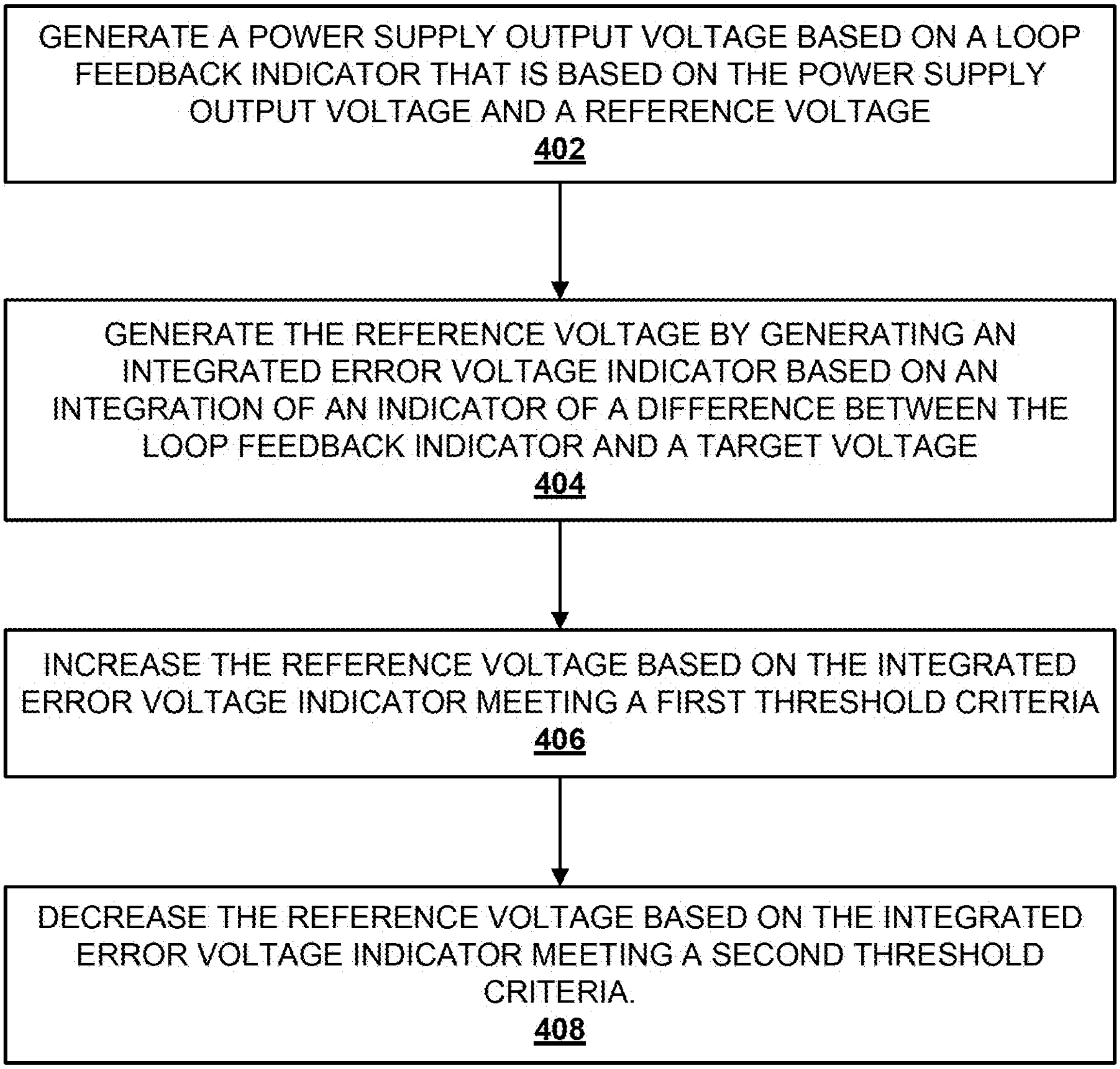
FIG. 4 is a flowchart illustrating a method of cancelling an offset voltage.

FIG. 4 is a flowchart illustrating a method of cancelling an offset voltage. One or more steps illustrated in FIG. 4 may be performed by, for example, voltage regulator 100, voltage cancellation circuitry 200, voltage cancelation circuitry 300, and/or their components. A power supply voltage is generated based on a loop feedback indicator that is based on the power supply output voltage and a reference voltage (402). For example, voltage regulator 100 may generate Vout from FB (which is based on Vout via feedback circuitry 113) and REF.

The reference voltage is generated by generating an integrated error voltage indicator based on an integration of a difference between the loop feedback indicator and a target voltage (404). For example, REF may be generated based on the output of integrator circuitry 222 which integrates the output of difference circuitry 221, where difference circuitry 221 outputs an indicator of the difference between a target voltage TRGT and loop feedback indicator FB.

Based on the integrated error voltage meeting a first threshold criteria, the reference voltage is increased (406). For example, based on the output of integrator circuitry 222 meeting a first threshold (e.g., less than Vdd/3), counter circuitry 225 may be controlled to increment CVAL[ ] which results in DAC 227 increasing REF. Based on the integrated error voltage meeting a second threshold criteria, the reference voltage is decreased (408). For example, based on the output of integrator circuitry 222 meeting a second threshold (e.g., greater than 2Vdd/3), counter circuitry 225 may be controlled to decrement CVAL[ ] which results in DAC 227 decreasing REF.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of voltage regulator 100, voltage cancellation circuitry 200, voltage cancelation circuitry 300, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 5:
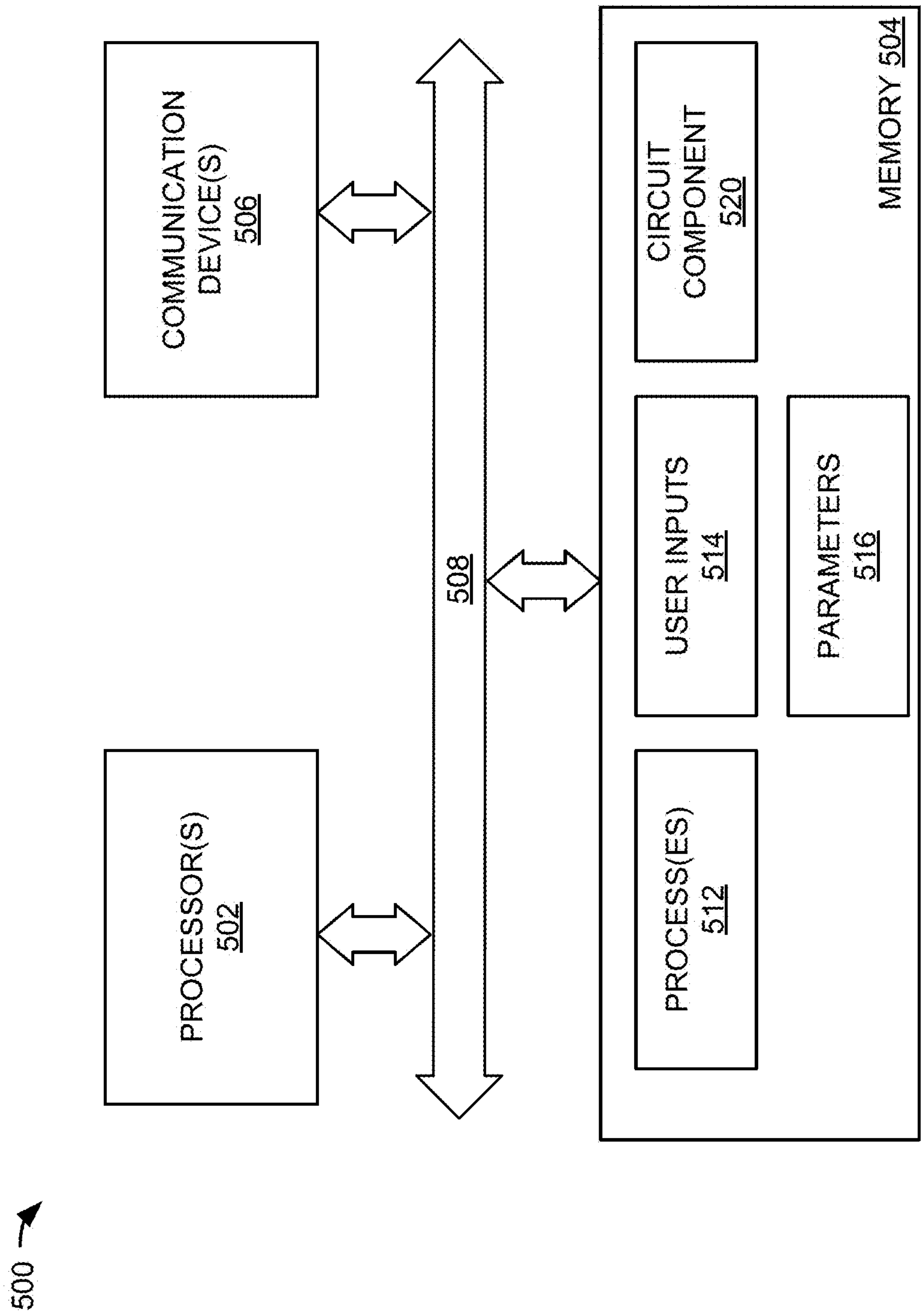
FIG. 5 is a block diagram of a processing system.

FIG. 5 is a block diagram illustrating one embodiment of a processing system 500 for including, processing, or generating, a representation of a circuit component 520. Processing system 500 includes one or more processors 502, a memory 504, and one or more communications devices 506. Processors 502, memory 504, and communications devices 506 communicate using any suitable type, number, and/or configuration of wired and/or wireless connections 508.

Processors 502 execute instructions of one or more processes 512 stored in a memory 504 to process and/or generate circuit component 520 responsive to user inputs 514 and parameters 516. Processes 512 may be any suitable electronic design automation (EDA) tool or portion thereof used to design, simulate, analyze, and/or verify electronic circuitry and/or generate photomasks for electronic circuitry. Representation 520 includes data that describes all or portions of voltage regulator 100, voltage cancellation circuitry 200, voltage cancelation circuitry 300, and their components, as shown in the Figures.

Representation 520 may include one or more of behavioral, register transfer, logic component, transistor, and layout geometry-level descriptions. Moreover, representation 520 may be stored on storage media or communicated by carrier waves.

Data formats in which representation 520 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 514 may comprise input parameters from a keyboard, mouse, voice recognition interface, microphone and speakers, graphical display, touch screen, or other type of user interface device. This user interface may be distributed among multiple interface devices. Parameters 516 may include specifications and/or characteristics that are input to help define representation 520. For example, parameters 516 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 504 includes any suitable type, number, and/or configuration of non-transitory computer-readable storage media that stores processes 512, user inputs 514, parameters 516, and circuit component 520.

Communications devices 506 include any suitable type, number, and/or configuration of wired and/or wireless devices that transmit information from processing system 500 to another processing or storage system (not shown) and/or receive information from another processing or storage system (not shown). For example, communications devices 506 may transmit circuit component 520 to another system. Communications devices 506 may receive processes 512, user inputs 514, parameters 516, and/or circuit component 520 and cause processes 512, user inputs 514, parameters 516, and/or circuit component 520 to be stored in memory 504.

Implementations discussed herein include, but are not limited to, the following examples:

Example 1: A voltage regulator circuit, comprising: a voltage control feedback loop to generate a power supply output voltage based on a loop feedback indicator that is based on the power supply output voltage and a reference voltage; and offset voltage cancelation circuitry to generate the reference voltage by integrating an indicator of a difference between the loop feedback indicator and a target voltage to generate an integrated error voltage indicator, the offset voltage cancellation circuitry to increase the reference voltage based on the integrated error voltage indicator meeting a first threshold criteria and to decrease the reference voltage based on the integrated error voltage indicator meeting a second threshold criteria.

Example 2: The voltage regulator circuit of example 1, wherein the voltage control feedback loop includes a pulsed signal and a frequency of the pulsed signal is based on the loop feedback indicator.

Example 3: The voltage regulator circuit of example 2, wherein the first threshold criteria comprises the integrated error voltage indicator being below a first threshold and an occurrence of a first pulse of the pulsed signal.

Example 4: The voltage regulator circuit of example 3, wherein the second threshold criteria comprises the integrated error voltage indicator being above a second threshold and an occurrence of a second pulse of the pulsed signal.

Example 5: The voltage regulator circuit of example 4, wherein an occurrence of a third pulse of the pulsed signal when the integrated error voltage indicator is above the first threshold and below the second threshold does not change the reference voltage.

Example 6: The voltage regulator circuit of example 2, wherein the integrated error voltage indicator is periodically set to an initial value based on a recurring number of pulse occurrences of the pulsed signal.

Example 7: The voltage regulator circuit of example 1, wherein the reference voltage is based on a sum of a digital target voltage value and a digital offset voltage cancellation value.

Example 8: A power supply circuit, comprising: a pulsed signal feedback loop to generate, based on a feedback indicator of an output voltage of the power supply circuit and an offset cancelled reference indicator; error indicator integrator circuity to produce an error voltage indicator based on integrating a difference between the feedback indicator and a target indicator;

digital offset cancellation value generator circuitry to adjust a digital offset cancellation value based on the error voltage indicator; and offset cancelled reference indicator circuitry to produce the offset cancelled reference indicator based on the digital offset cancellation value.

Example 9: The power supply circuit of example 8, further comprising: comparator circuitry to indicate whether the error voltage indicator meets one of a first threshold criteria and a second threshold criteria.

Example 10: The power supply circuit of example 9, wherein the comparator circuitry is to further indicate whether the error voltage indicator meets a third threshold criteria.

Example 11: The power supply circuit of example 10, wherein the first threshold criteria is associated with the error voltage indicator exceeding a first threshold value, the second threshold criteria is associated with the error voltage indicator being below a second threshold value, and the third threshold criteria is associated with the error voltage indicator being below the first threshold value and above the second threshold value.

Example 12: The power supply circuit of example 8, wherein the pulsed signal feedback loop includes a pulsed signal that is based on a difference between the feedback indicator and the offset cancelled reference indicator.

Example 13: The power supply circuit of example 12, wherein adjustments to the digital offset cancellation value are based on occurrences of pulses of the pulsed signal.

Example 14: The power supply circuit of example 13, wherein the error voltage indicator is set to an initial state based on a number of pulses of the pulsed signal.

Example 15: A method of generating a regulated voltage, comprising: generating a power supply output voltage based on a loop feedback indicator that is based on the power supply output voltage and a reference voltage; generating the reference voltage by generating an integrated error voltage indicator based on an integration of an indicator of a difference between the loop feedback indicator and a target voltage; increasing the reference voltage based on the integrated error voltage indicator meeting a first threshold criteria; and decreasing the reference voltage based on the integrated error voltage indicator meeting a second threshold criteria.

Example 16: The method of example 15, further comprising: generating a pulsed signal based on the loop feedback indicator.

Example 17: The method of example 16, wherein the first threshold criteria comprises the integrated error voltage indicator being below a first threshold and an occurrence of a first pulse of the pulsed signal.

Example 18: The method of example 17, wherein the second threshold criteria comprises the integrated error voltage indicator being above a second threshold and an occurrence of a second pulse of the pulsed signal.

Example 19: The method of example 18, wherein an occurrence of a third pulse of the pulsed signal when the integrated error voltage indicator is above the first threshold and below the second threshold does not change the reference voltage.

Example 20: The method of example 16, further comprising: repeatedly setting the integrated error voltage indicator to an initial value based on an occurrence of a predetermined number of pulse occurrences of the pulsed signal.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A voltage regulator circuit, comprising:

a voltage control feedback loop to generate a power supply output voltage based on a loop feedback indicator that is based on the power supply output voltage and a reference voltage; and offset voltage cancelation circuitry to generate the reference voltage by integrating an indicator of a difference between the loop feedback indicator and a target voltage to generate an integrated error voltage indicator, the offset voltage cancellation circuitry to increase the reference voltage based on the integrated error voltage indicator meeting a first threshold criteria and to decrease the reference voltage based on the integrated error voltage indicator meeting a second threshold criteria.

2. The voltage regulator circuit of claim 1, wherein the voltage control feedback loop includes a pulsed signal that is based on the loop feedback indicator.

3. The voltage regulator circuit of claim 2, wherein the first threshold criteria comprises the integrated error voltage indicator being below a first threshold and an occurrence of a first pulse of the pulsed signal.

4. The voltage regulator circuit of claim 3, wherein the second threshold criteria comprises the integrated error voltage indicator being above a second threshold and an occurrence of a second pulse of the pulsed signal.

5. The voltage regulator circuit of claim 4, wherein an occurrence of a third pulse of the pulsed signal when the integrated error voltage indicator is above the first threshold and below the second threshold does not change the reference voltage.

6. The voltage regulator circuit of claim 2, wherein the integrated error voltage indicator is periodically set to an initial value based on a recurring number of pulse occurrences of the pulsed signal.

7. The voltage regulator circuit of claim 1, wherein the reference voltage is based on a sum of a digital target voltage value and a digital offset voltage cancellation value.

8. A power supply circuit, comprising:

a pulsed signal feedback loop to generate, based on a feedback indicator of an output voltage of the power supply circuit and an offset cancelled reference indicator;

error indicator integrator circuity to produce an error voltage indicator based on integrating a difference between the feedback indicator and a target indicator;

digital offset cancellation value generator circuitry to adjust a digital offset cancellation value based on the error voltage indicator; and offset cancelled reference indicator circuitry to produce the offset cancelled reference indicator based on the digital offset cancellation value.

9. The power supply circuit of claim 8, further comprising:

comparator circuitry to indicate whether the error voltage indicator meets one of a first threshold criteria and a second threshold criteria.

10. The power supply circuit of claim 9, wherein the comparator circuitry is to further indicate whether the error voltage indicator meets a third threshold criteria.

11. The power supply circuit of claim 10, wherein the first threshold criteria is associated with the error voltage indicator exceeding a first threshold value, the second threshold criteria is associated with the error voltage indicator being below a second threshold value, and the third threshold criteria is associated with the error voltage indicator being below the first threshold value and above the second threshold value.

12. The power supply circuit of claim 8, wherein the pulsed signal feedback loop includes a pulsed signal that is based on a difference between the feedback indicator and the offset cancelled reference indicator.

13. The power supply circuit of claim 12, wherein adjustments to the digital offset cancellation value are based on occurrences of pulses of the pulsed signal.

14. The power supply circuit of claim 13, wherein the error voltage indicator is set to an initial state based on a number of pulses of the pulsed signal.

15. A method of generating a regulated voltage, comprising:

generating a power supply output voltage based on a loop feedback indicator that is based on the power supply output voltage and a reference voltage;

generating the reference voltage by generating an integrated error voltage indicator based on an integration of an indicator of a difference between the loop feedback indicator and a target voltage;

increasing the reference voltage based on the integrated error voltage indicator meeting a first threshold criteria; and decreasing the reference voltage based on the integrated error voltage indicator meeting a second threshold criteria.

16. The method of claim 15, further comprising:

generating a pulsed signal based on the loop feedback indicator.

17. The method of claim 16, wherein the first threshold criteria comprises the integrated error voltage indicator being below a first threshold and an occurrence of a first pulse of the pulsed signal.

18. The method of claim 17, wherein the second threshold criteria comprises the integrated error voltage indicator being above a second threshold and an occurrence of a second pulse of the pulsed signal.

19. The method of claim 18, wherein an occurrence of a third pulse of the pulsed signal when the integrated error voltage indicator is above the first threshold and below the second threshold does not change the reference voltage.

20. The method of claim 16, further comprising:

repeatedly setting the integrated error voltage indicator to an initial value based on an occurrence of a predetermined number of pulse occurrences of the pulsed signal.

* * * * *